T. J. LANN.
MOWING MACHINE.
APPLICATION FILED MAY 20, 1911.

1,013,787.

Patented Jan. 2, 1912.

2 SHEETS—SHEET 1.

Witnesses

Inventor
T. J. Lann

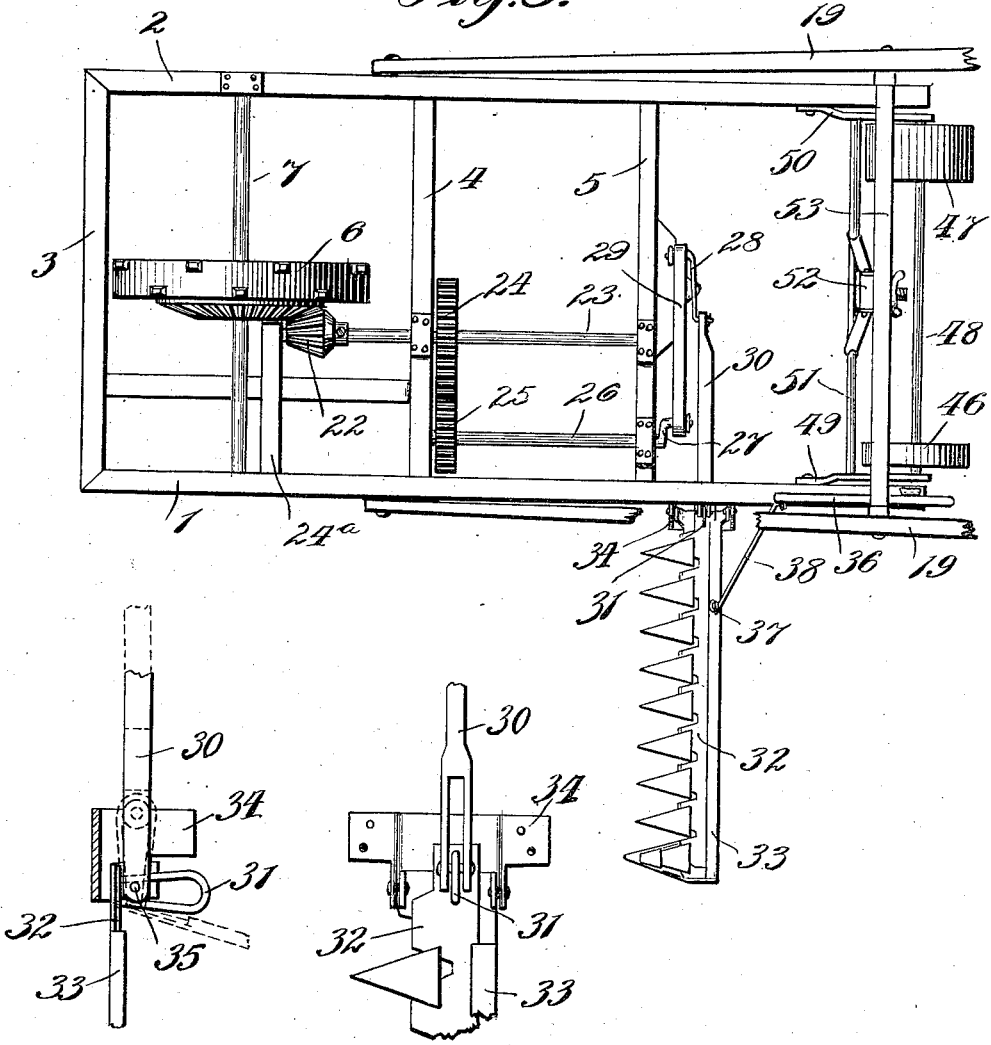

UNITED STATES PATENT OFFICE.

TURNER J. LANN, OF SALINE, LOUISIANA.

MOWING-MACHINE.

1,013,787.  Specification of Letters Patent.  Patented Jan. 2, 1912.

Application filed May 20, 1911. Serial No. 628,530.

*To all whom it may concern:*

Be it known that I, TURNER J. LANN, a citizen of the United States, residing at Saline, in the parish of Bienville and State of Louisiana, have invented certain new and useful Improvements in Mowing-Machines; and I do hereby declare the following to be a full, clear, and exact description of the invention, such as will enable others skilled in the art to which it appertains to make and use the same.

This invention relates to improvements in horse power mowing machines of the reciprocating cutter type, and has for its object to provide a machine having a pivoted adjustable cutter at each side thereof for cutting a double row, and each cutter may be independently raised to allow same to pass over stones or stumps.

A further object of the invention is to arrange fingers behind the cutters for clearing the path over which the machine passes.

With the above and other objects in view, the invention consists in certain combinations and arrangements of the parts hereinafter fully described, and the novel features thereof will be particularly pointed out in the appended claims.

The preferred embodiment of the invention is illustrated in the accompanying drawings forming part of this specification, and in which drawings like characters of reference indicate corresponding parts.

Figure 1:
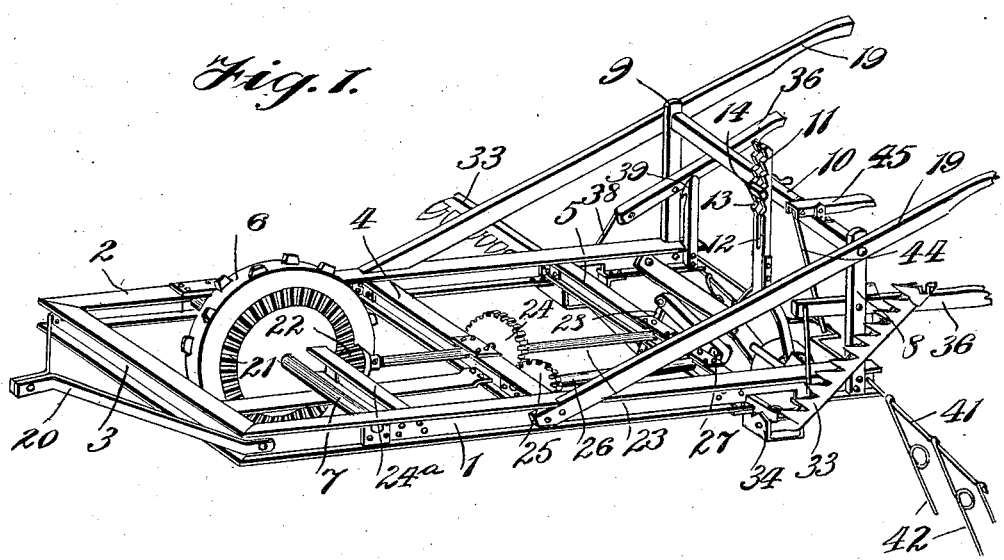
Figure 2:
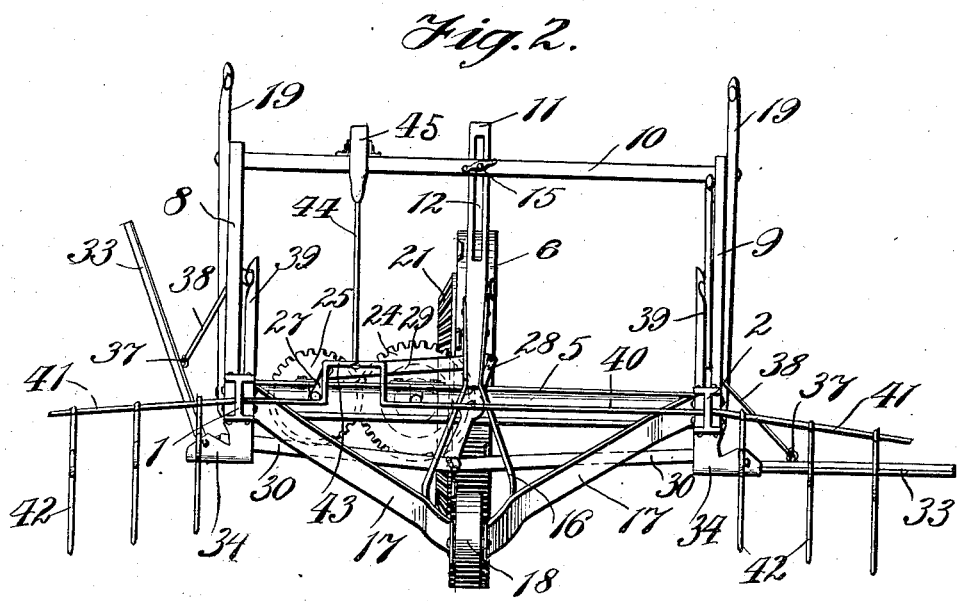

Figure 1 is a perspective view of a mowing machine embodying my invention, Fig. 2 is a rear elevation of same, Fig. 3 is a plan view of a slightly modified form, and Figs. 4 and 5 show a detail plan and elevational view of the connection between a cutter and the machine.

Referring to the drawings, the frame of the machine, which is preferably constructed of metal, consists of a pair of longitudinal members 1 and 2 joined together at their front ends by a transverse member 3, and intermediate their lengths are cross pieces 4 and 5. The forward end of the machine is supported by a cleated wheel 6 centrally fixed on an axle 7 journaled in the longitudinal members 1 and 2.

The rear end of the frame is adjustably supported as follows:—Uprights 8 and 9 rigidly fastened to the rear end portion of the longitudinal members 1 and 2 are connected together at their upper ends by a cross bar 10, to the center of which is adjustably secured a vertical bar 11 having a slot 12 and transverse teeth 13, which are engaged by a suitable head 14 of a clamping bolt 15 passing through the slot 12 and the cross bar 10. At the lower end of the vertical bar 11 is a forked member 16, which is pivotally connected to a pair of rearwardly converging legs 17 pivoted to the longitudinal members 1 and 2 of the frame, and having rotatably mounted between their other ends a wheel 18. A pair of suitable handles 19 are connected to the upper ends of the uprights 8 and 9 and to the longitudinal members 1 and 2 of the frame. A yoke 20 is pivotally attached to the forward end of the frame to provide means for drawing the machine. The cleated wheel 6 carries on one of its sides a bevel gear 21 for driving a bevel pinion 22 fixed to a longitudinally extending main shaft 23 journaled in the cross pieces 4 and 5, and having its forward end journaled in a transverse piece 24ª projecting from the longitudinal member 1. Fixed to the main shaft 23 is a gear 24, which meshes with a gear 25 fixed to a shaft 26 also journaled in the cross pieces 4 and 5 and carrying at its rear end a crank 27 for actuating a vertical lever 28 pivoted on the cross piece 5 and connected to said crank by a link 29. The lower end of the lever 28 is pivotally connected to oppositely extending transverse bars 30, each having its free end bifurcated for receiving a vertical loop 31 projecting from a cutter 32 slidably mounted in a finger bar 33 having its inner end pivotally connected to a trough-shaped casting 34 depending from the longitudinal members 1 and 2 of the frame. The bifurcated end of each bar 30 is connected to its loop 31 by means of a pin 35, as shown in Figs. 4 and 5, which engages the inner sides of the loop to actuate the cutter. Each finger bar may be swung upwardly by means of a handle 36 pivotally mounted on the uprights 8 and 9 and connected to each finger bar as at 37 by a rod 38. A catch 39 projecting from each longitudinal member 1 and 2 is provided to hold each handle 36 for locking each finger bar in raised position. When the finger bar is in its raised position, as shown in dotted lines in Fig. 5, the pin 35 of the bar 30 travels back and forth in the loop 31 and the cutter is therefore not operated. Pivotally mounted in the longitudinal members 1 and 2 is a rod 40 having rearwardly bent end portions 41 at each side of the machine, which carry a plurality of spring fingers 42 in the rear of the cutters for dragging off the cut products from the path passed over by the machine. In the rod 40 is formed a crank 43, to which is connected a link rod 44 connected with a lever 45 pivotally mounted on the cross bar 10. When the fingers 42 become choked, the lever 45 may be operated to rotate the rod 40 and raise the fingers.

In the modification shown in Fig. 3, there is only one cutter, and the rear end of the frame is adjustably supported by two wheels 46 and 47 on an axle 48 carried by links 49 and 50 pivoted to the frame of the machine. The links 49 and 50 are joined together by a rod 51, to which is pivoted a forked bar 52 similar to the bar 11 and adjustably secured to a cross bar 53 in a similar manner as already described.

It is apparent from the foregoing that I have provided a machine, the rear end of which may be adjustably raised to cut different heights from the ground, that power will be transmitted from the forward supporting wheel to the link pivoted to the rear cross piece of the frame and the cutters reciprocated, and that either finger bar may be raised independently for passing over stones or stumps when the machine is in operation and the finger bars locked in raised position.

It is to be understood that various changes in the form, proportion, and minor details of construction may be resorted to without sacrificing any of the advantages or departing from the spirit of the invention.

Having fully described my invention, what I claim is:—

1. In a mowing machine, the combination of a frame, a forward supporting wheel for the frame, means for adjusting the rear end of the frame, a main shaft journaled in the frame and rotated from the forward supporting wheel, a crank actuated from the main shaft, a lever pivoted to the frame and operated by the crank, a cutter pivotally supported from the frame, means for raising the cutter, and means connecting the cutter to said crank for actuating the cutter when in its cutting position and allowing it to remain at rest when in a raised position, substantially as described.

2. In a mowing machine, the combination of a frame, a forward supporting wheel for the frame, means for adjusting the rear end of the frame, a main shaft journaled in the frame and rotated from the forward supporting wheel, a crank actuated from the main shaft, a lever pivoted to the frame and operated by the crank, a finger bar pivoted to the frame, a cutter reciprocatingly mounted in the finger bar, a loop projecting from the cutter and a bifurcated bar connecting said lever to the loop, whereby the cutter is reciprocated when in its cutting position and allowed to remain at rest when in a raised position, substantially as described.

3. In a mowing machine, the combination of a frame supported on wheels, a main shaft journaled in the frame and rotated from one of the supporting wheels, a crank actuated from the main shaft, a lever pivoted to the frame and operated by the crank, a finger bar pivoted to the frame, a cutter reciprocatingly mounted in the finger bar, a loop projecting vertically from the inner end portion of the cutter, a bar pivotally connected to said lever and having a bifurcated end embracing said loop, and a pin passing through the bifurcated end of said bar and through said loop, whereby the cutter is reciprocated in its cutting position and allowed to remain at rest when in a raised position, substantially as described.

In testimony whereof, I affix my signature, in presence of two witnesses.

TURNER J. LANN.

Witnesses:
S. A. LEWIS,
GEO. J. LUCKY.

---

Copies of this patent may be obtained for five cents each, by addressing the "Commissioner of Patents, Washington, D. C."